A. COPONY.
BOLSTER GUIDE PLATE FOR RAILWAY CAR TRUCKS.
APPLICATION FILED JUNE 6, 1913.
1,073,333.
Patented Sept. 16, 1913.
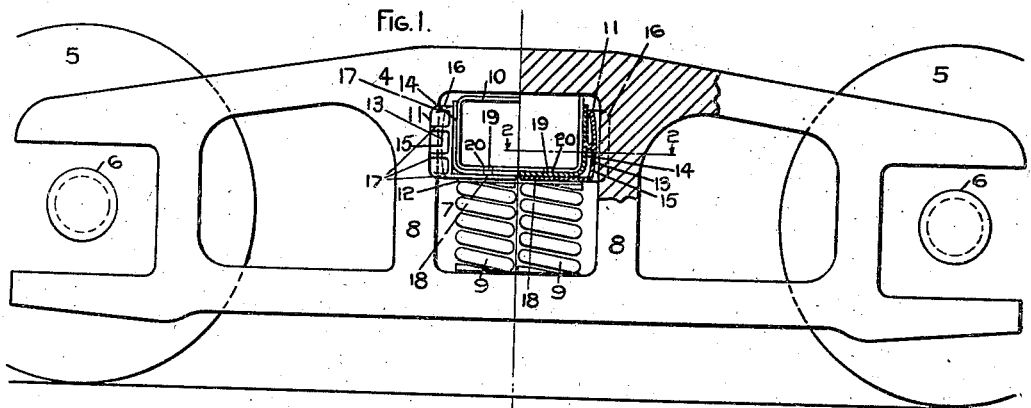
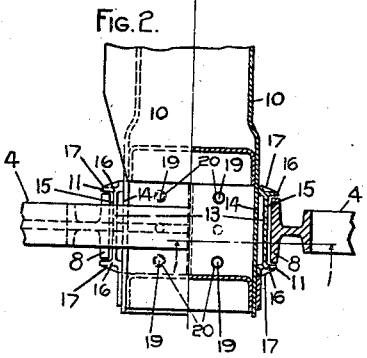
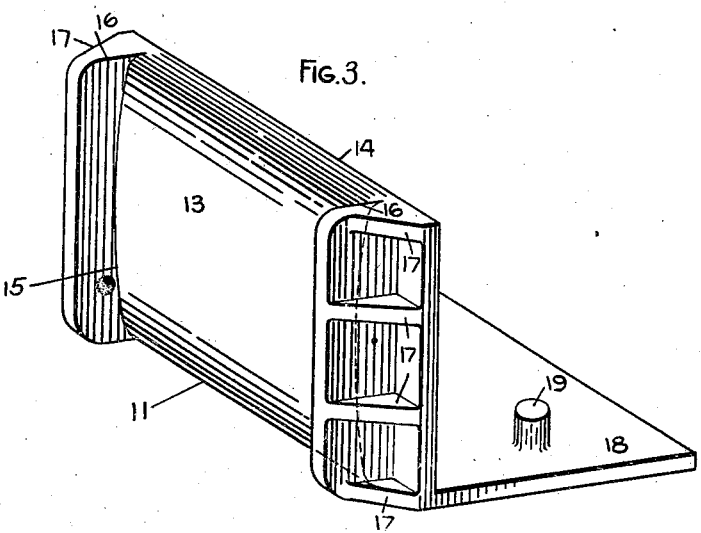
WITNESSES:
INVENTOR.
Alfred Copony
BY
HIS ATTORNEY.

UNITED STATES PATENT OFFICE.

ALFRED COPONY, OF VERDUN, QUEBEC, CANADA.

BOLSTER-GUIDE PLATE FOR RAILWAY-CAR TRUCKS.

1,073,333.  Specification of Letters Patent.  Patented Sept. 16, 1913.

Application filed June 6, 1913.  Serial No. 772,021.

*To all whom it may concern:*

Be it known that I, ALFRED COPONY, a citizen of the Austro-Hungarian Empire, residing at Verdun, in the Province of Quebec and Dominion of Canada, have invented a certain new and useful Improvement in Bolster-Guide Plates for Railway-Car Trucks, of which the following is a full, clear, concise, and exact description, reference being had to the accompanying drawings, forming a part of this specification.

My invention relates to bolster guide plates for railway car trucks.

In usual construction of trucks for railway cars, more particularly freight cars, the side truck frames are provided intermediate their ends with upright truck columns, generally in vertical arrangement and spaced apart, between which columns are arranged bolster guide plates seated upon the truck springs, the bolster guide plates being in sliding engagement with the said columns and bearing the ends of the truck bolster. Heretofore the bearing surfaces of the bolster guide plates at the point of their engagement with the truck columns have been substantially kept parallel to the adjacent faces of the truck column, and as a result thereof when one set of wheels of a truck have been derailed without derailing the other set or sets of wheels the bolster guide plates have bound between the truck columns, thus tending to spread the truck columns and seriously damaging the truck. It is necessary in car construction that there should be only a slight clearance, substantially not more than one-eighth of an inch, between the bolster guide plates and the truck column so that blows caused by buffing shocks will be transmitted from the truck bolster to the truck frame with a minimum of movement of the truck bolster.

The object of my invention is to provide for this minimum clearance between the truck bolster and truck frame at their points of interengagement, and at the same time provide bolster guide plates which will permit the derailment of one set of wheels of a truck without binding the truck bolster between the truck columns.

In the drawings forming a part of this specification Figure 1 is a side elevation of a truck frame with the bolster and bolster guide plates in position therein, part of the truck frame being broken away, the bolster and bolster plates being partly in cross section on line 1—1 of Fig. 2. Fig. 2 is a top plan view about the meeting point of the end of the bolster and one of the truck side frames partly in horizontal section on line 2—2 of Fig. 1. Fig. 3 is a perspective view of one of the bolster guide plates.

In the drawings the numeral 4 represents a truck side frame, 5, 5 car wheels, the axles 6, 6 of which are suitably journaled to the truck frame. Intermediate its ends the truck side frame is provided with the opening 7, the sides of which are formed by the upright truck columns 8; 8 within which opening are disposed the truck springs 9, 9, the truck bolster 10 and a pair of bolster guide plates 11, 11. The truck springs 9, 9 are seated at their lower ends against the truck side frame, and at their upper ends against the spring cap 12. The bolster guide plates are preferably two in number for each side frame, each of said bolster guide plates comprising an upright member 13 engaging one side of the truck bolster 10 at its inner face 14, and having the curved outer or bearing face 15 adapted to engage against the adjacent truck column 8. The upright member 13 is provided at either end with an outwardly turned flange 16, the said flanges being adapted to engage the sides of the adjacent truck column. In preferable construction each of said flanges is provided along its outer edge with reinforcing flanges 17. In preferable construction the upright member 13 is provided at its lower edge with an angular flange 18 adapted to engage between the spring cap 12 and the truck bolster 10, the said flange being provided with a plurality of upwardly extended lugs 19 adapted to engage within perforations 20 in the lower face of the truck bolster 10 to secure the bolster guide plate to the truck bolster. One of these bolster guide plates is arranged at each side of the truck bolster between the truck columns of each side truck frame.

It will be apparent that in the event of derailment of one set of wheels, causing the truck frame to be lowered at one end and a consequent change in the relative positions of the truck frame and car body, that the truck bolsters bearing the weight of the car body will tend to turn within the opening 7 of the truck side frame, and that by reason of the curved bearing face 15 with which each of the bolster guide plates is provided there will be no binding of the plates and truck bolster between the truck column.

It is preferable that the curve of the bearing face of each of the bolster guide plates be of suitable radius to provide a uniform clearance between the bolster guide plates and the truck columns in all relative variations of position between the truck columns and bolster.

I claim:—

1. In a railway car, the combination of a truck side frame having truck columns with a bolster mounted between said columns, the bolster being provided with guide plates adapted to engage said columns, each of said guide plates having a curved friction face.

2. In a railway car, in combination, a truck side frame having truck columns, a truck bolster disposed between said columns and bolster guide plates connected to the truck bolster, the said guide plates having outward curved bearing faces to engage the inner faces of the column, and flanges at either end of said face to engage the sides of said column.

3. In a railway car, in combination, a side truck frame, truck columns therein, truck springs and truck bolster between said columns, the truck bolster being provided at either side with bolster guide plates, each of said guide plates having an outward curved friction face.

4. A bolster guide plate comprising a member having an outward curved friction face and an angular member connected thereto, in combination with a truck bolster, the said angular member being provided with means for connecting the same to the truck bolster.

5. In a railway car, in combination, a side truck frame, truck columns therein, a bolster and truck springs between said column, the bolster being provided at either side with a bolster guide plate, each of said guide plates having a curved friction surface for engagement with the adjacent truck column, and each having an inturned angular flange, said flange being disposed between the truck bolster and the truck springs.

6. In a railway car, in combination, a side truck frame, truck columns therein, a bolster and truck springs between said column, the bolster being provided at either side with a bolster guide plate, each of said guide plates having a curved friction surface for engagement with the adjacent truck column, and each having an inturned angular flange, said flange being provided with lugs, and the bolster being provided with perforations to receive said lugs.

ALFRED COPONY.

Witnesses:
J. G. OSNER,
A. DOBSON.